Nov. 5, 1935.  A. B. HENDRICKS, JR  2,020,058

DYNAMO ELECTRIC MACHINE AND A METHOD OF MAKING THE SAME

Filed March 7, 1934

Inventor:
Allan B. Hendricks Jr,
by Harry E. Dunham
His Attorney.

Patented Nov. 5, 1935

2,020,058

UNITED STATES PATENT OFFICE 2,020,058

DYNAMO ELECTRIC MACHINE AND A METHOD OF MAKING THE SAME

Allan B. Hendricks, Jr., Pittsfield, Mass., assignor to General Electric Company, a corporation of New York Application March 7, 1934, Serial No. 714,466

7 Claims. (Cl. 171—206)

My invention relates to dynamo-electric machines and a method of making the same.

An object of my invention is to provide an improved rotor construction for dynamo-electric machines and a method of making the same.

Further objects and advantages of my invention will become apparent as the following description proceeds, and the features of novelty which characterize my invention will be pointed out with particularity in the claims annexed to and forming a part of this specification.

Figure 1:
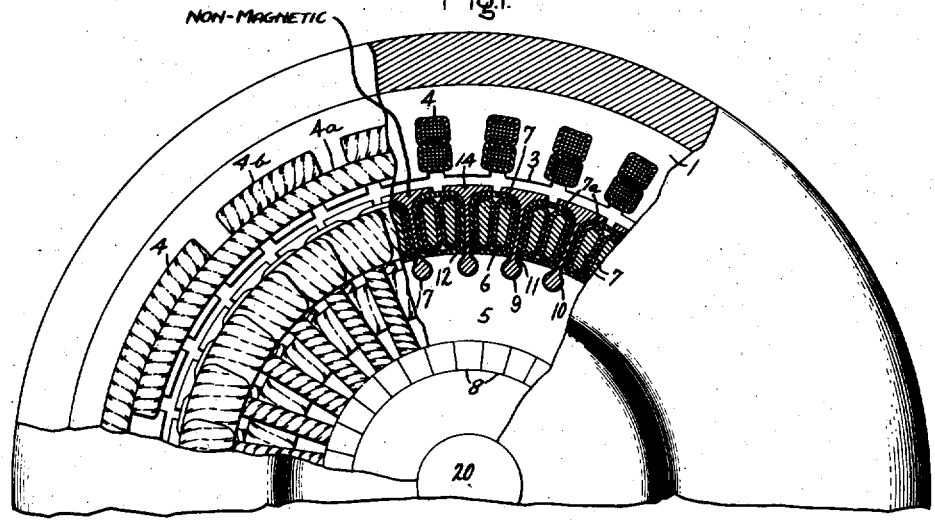
Figure 2:
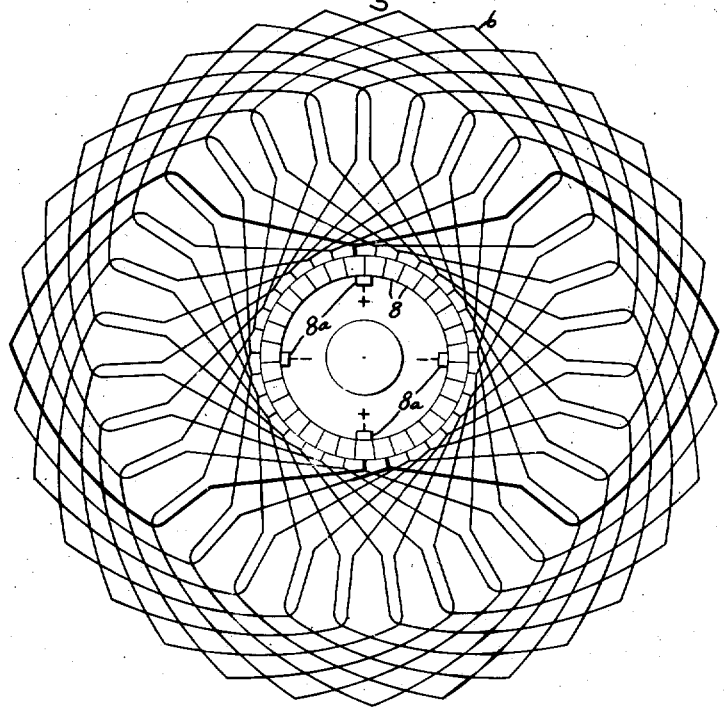
Figure 3:
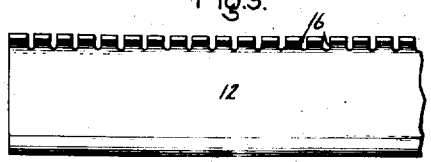
Figure 4:
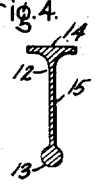

For a better understanding of my invention reference may be had to the accompanying drawing in which Fig. 1 is an end elevation partly broken away of a dynamo-electric machine embodying my invention; Fig. 2 is a circuit diagram of the armature connections for the armature shown in Fig. 1; and Figs. 3 and 4 are side and end views respectively of a key for securing the rotor conductors to the core.

For purposes of illustration, my invention will be described in relation to a direct current armature structure, but, as will be readily understood, the various features of the invention are equally applicable to any other type of electrical apparatus including a winding secured in position upon a core by means of pivoted conductor retaining members.

In Fig. 1 of the drawing reference numeral 1 indicates a core of a stationary member which is preferably of the laminated type having teeth 3 distributed evenly around the inner circumference thereof. The teeth 3 define slots 2 in which the main field coils 4, compensating coils 4a, and four commutating coils 4b are placed, it being understood that four groups of each of these coils are symmetrically placed about the stationary member of the four pole machine illustrated. The main field windings 4 and the compensating windings 4a are preferably fully distributed around the stator core. The main field windings 4 are connected in shunt across the armature, and the compensating and commutating windings are connected in series with the armature of the machine. The interaction between the fluxes generated by the respective windings is such that a substantially sinusoidal flux distribution is present in the airgap at all loads of the machine. Such a flux distribution is desirable from the standpoint of good commutation.

The armature shown in Fig. 1 comprises a laminated core 5 having windings 6 fully distributed over the surface thereof. The core 5 is preferably annular in cross section and is secured to the shaft 20 in any suitable manner.

By locating the windings on the surface of the rotor core the heat generated by the losses in the conductors is readily dissipated in the air circulating through the airgap of the machine. The absence of large slots in the core reduces the ripple in the output voltage and also improves commutation. The airgap necessarily employed in order to make room for the conductors also tends to improve the operating characteristics of the machine since it insures a low armature reaction and a uniform magnetic field in the machine.

The outer surface of the core has longitudinal slots 9 which extend the entire length of the core. Each slot has a relatively large base portion 10 and a small channel portion 11 at the outer edge of the slot. The base portion 10 is preferably circular, although it may be made in any other suitable shape. The windings are secured to the surface of the core by non-magnetic members or keys 12 which are shown in Figs. 3 and 4. Each key comprises a beaded portion 13 which is substantially cylindrical and engages the circular portion 10 of the slots 9, a flange 14 which engages the outer edges of the armature coils so as to retain them on the core, and a narrow shank portion 15 connecting the bead and the flange. The shanks of the keys are made as thin as possible in order to save space. The channels 11 of the slots 9 are preferably wider than the shanks of the keys in order to permit a limited pivotal movement of the keys with respect to the rotor core after the keys have been mounted on the core.

The keys 12 are made of a high resistance material which is substantially non-magnetic, such as: steel containing about 18% chromium and 8% nickel; nickel steel containing about 30% nickel; manganese silicon bronz; or phosphor bronze. All of the above materials are substantially non-magnetic, possess high mechanical strength and high electrical resistance. The non-magnetic property prevents distortion of the flux distribution in the airgap, the high resistance characteristic minimizes the losses caused by parasitic currents generated in the members as they cut the airgap flux and the high mechanical strength of the keys permits the members to be constructed with extremely narrow shanks. It should here be noted that circulating currents in the members are highly undesirable, since such currents increase the losses and tend to distort the flux distribution thereby causing bad commutation and also voltage ripples in the output voltage. To further minimize the parasitic currents circulating in the members 12, the flange portion may be slotted as shown at 16 in Fig. 3. These slots designated at 16 extend transversely to the longitudinal axis of the members 12 and divide the flange portions of each member 12 into a plurality of small portions which are electrically connected only at the base of the flange. In order to prevent the short circuiting of the rotor core laminations through the beaded portions of the members 12, each slot 9 in the core is lined with a layer of insulating material. This insulating lining, indicated by reference numeral 17, may be made of mica, hard paper, or other suitable material.

In the form of my invention shown in Figs. 1 and 2, each armature coil side comprises a single armature conductor 7. The armature conductors are of the transposed laminated type, the use of which reduces the loss due to the generation of parasitic circulating currents in the conductors. This type of conductor is well known in the art and forms no part of my invention. As shown in Fig. 2, the armature conductors are connected to form a winding of the wave type. The coil ends are brought out and connected to commutator segments 8 from which the current is conducted to the terminals of the machine by a circuit including brushes 8a. It will be appreciated that many other types of windings known to the art may be employed and that the number and arrangement of the conductors may be varied to meet the requirements of a particular machine.

In building up the armature winding, a plurality of the keys or pivoted retaining members 12 are inserted in one of the slots 9 in the armature core in which insulating material 17 has been placed; a pair of insulated armature conductors 7 enclosed by an insulating wrapping 7a is then placed in a position such that one side of one conductor is adjacent the row of keys; after which a second row of keys is driven into a second slot adjacent the first slot and the armature conductors. In positioning the second row of keys, each key is pivoted or tipped radially away from the side of the conductor to which it is adjacent, after which it is driven full length into the slot into its final position longitudinally of the core. The key is then swung or pivoted back into its true radial or normal conductor retaining position. This procedure permits the ready insertion of the keys without damaging the insulation of the conductors since the keys are out of contact with the insulation of the conductors when the keys are driven in place. The process of placing the coil sides and driving a row of keys is repeated until the entire core surface is filled up and all the conductors are in place. After all of the coil sides and keys are in place, the conductors are connected together in accordance with the form and design of armature desired and the armature coils thus formed are connected in their proper order to the commutator segments. It will readily be seen that the resulting armature structure will be symmetrical and extremely solid. It will also be apparent that the armature may be easily assembled or taken apart for the purpose of making repairs. The non-magnetic keys being in close proximity to the armature conductors tend to conduct the heat from the sides of the conductors to the core and airgap where it will be dissipated, thereby furnishing an additional means for keeping the conductors cool.

While I have described a particular embodiment of my invention, it will be apparent that the disclosure herein set forth is only illustrative and that I intend in the appended claims to cover all modifications thereof falling within the scope and spirit of my invention.

What I claim as new and desire to secure by Letters Patent of the United States is:

1. A rotor for dynamo electric machines, comprising a core, windings fully distributed over substantially the entire surface of said core, and means including a plurality of non-magnetic members pivotally secured to said core having narrow shanks and flanged end portions adapted to engage the outer edges of said windings for retaining said windings on said core.

2. An armature for direct current dynamo electric machines, comprising a core slotted axially at intervals around its periphery, windings fully distributed over the surface of said core, and means including non-magnetic keys having beaded portions pivotally secured in said slots for retaining said windings on said core.

3. An armature for direct current dynamo electric machines, comprising a laminated core having slots of substantially circular cross section spaced circumferentially around the periphery of said core, windings fully distributed over the surface of said core, and means including a plurality of non-magnetic keys having substantially cylindrical portions for pivotally securing said keys in said slots and having flanged portions adapted to engage the outer edges of said windings for retaining said windings on said core.

4. A rotor for dynamo electric machines, comprising a laminated core having slots of substantially circular cross section spaced circumferentially around the periphery of said core, windings comprising a plurality of coil sides fully distributed over the surface of said core, and means including a plurality of non-magnetic keys for retaining said windings on said core, said keys each comprising a beaded portion pivotally engaging one of said slots, a flanged portion engaging the outer edge of one of said coil sides, and a narrow portion connecting said flanged and beaded portions.

5. A method of assembling an electrical apparatus having a core and an alternate arrangement of conductors and conductor retaining members pivotally secured to said core, which comprises successively mounting said conductors and said retaining members in alternate sequence upon said core, said retaining members being first mounted on said core out of contact with said conductors and then pivoted into normal conductor retaining position.

6. A method of assembling a dynamo-electric machine having a core and an alternate arrangement of conductors and conductor retaining members pivotally secured to said core, which comprises placing a conductor in position upon said core, mounting a pivoted retaining member on said core angularly displaced from said conductor, and pivoting said retaining member into normal conductor retaining position.

7. A method of assembling an electrical apparatus including a winding secured in position upon a core by keyed retaining members, which comprises placing a conductor in position upon the core mounting a retaining member upon the core in substantially its final position longitudinally of the core and out of normal conductor retaining position for providing a widened conductor slot during assembly, and positioning said member in normal retaining relation to the conductor.

ALLAN B. HENDRICKS, Jr.